United States Patent [19]
Plegat

[11] 3,930,400
[45] Jan. 6, 1976

[54] SELF-OPERATING MACHINE FOR DRY TEST OF HOLLOW BODIES OF THE HEAT EXCHANGER TYPE AND THE LIKE

[75] Inventor: Alain Edouard Plegat, Asnieres, France

[73] Assignee: Societe Anonyme des Usines Chausson, Asnieres, France

[22] Filed: Apr. 24, 1974

[21] Appl. No.: 463,759

[30] Foreign Application Priority Data
May 11, 1973  France .............................. 73.17206

[52] U.S. Cl. ................................................ 73/45.2
[51] Int. Cl.² .............................................. G01M 3/04
[58] Field of Search ......... 73/40, 41, 45, 45.1, 45.2; 165/11

[56] References Cited
UNITED STATES PATENTS

| | | | |
|---|---|---|---|
| 1,873,602 | 8/1932 | Kruse | 73/45.2 |
| 1,900,918 | 3/1933 | Dieter | 73/45.2 |
| 2,962,655 | 11/1960 | Wiley et al. | 73/41 UX |
| 3,176,503 | 4/1965 | Robinson | 73/40 |

Primary Examiner—Richard E. Aegerter
Assistant Examiner—Frederick R. Schmidt
Attorney, Agent, or Firm—Flynn & Frishauf

[57] ABSTRACT

The machine comprises a rotary table supporting similar working stations. Each station supports a reference heat exchanger and a heat exchanger to be tested. The operations related to a simultaneous supply of compressed gas in the two exchangers, isolation of said exhangers, control of their residual pressure, etc... are controlled during a complete rotation of the table from fixed annular segments placed concentrically to the table and read by brushes supported by bars related to each working station.

24 Claims, 9 Drawing Figures

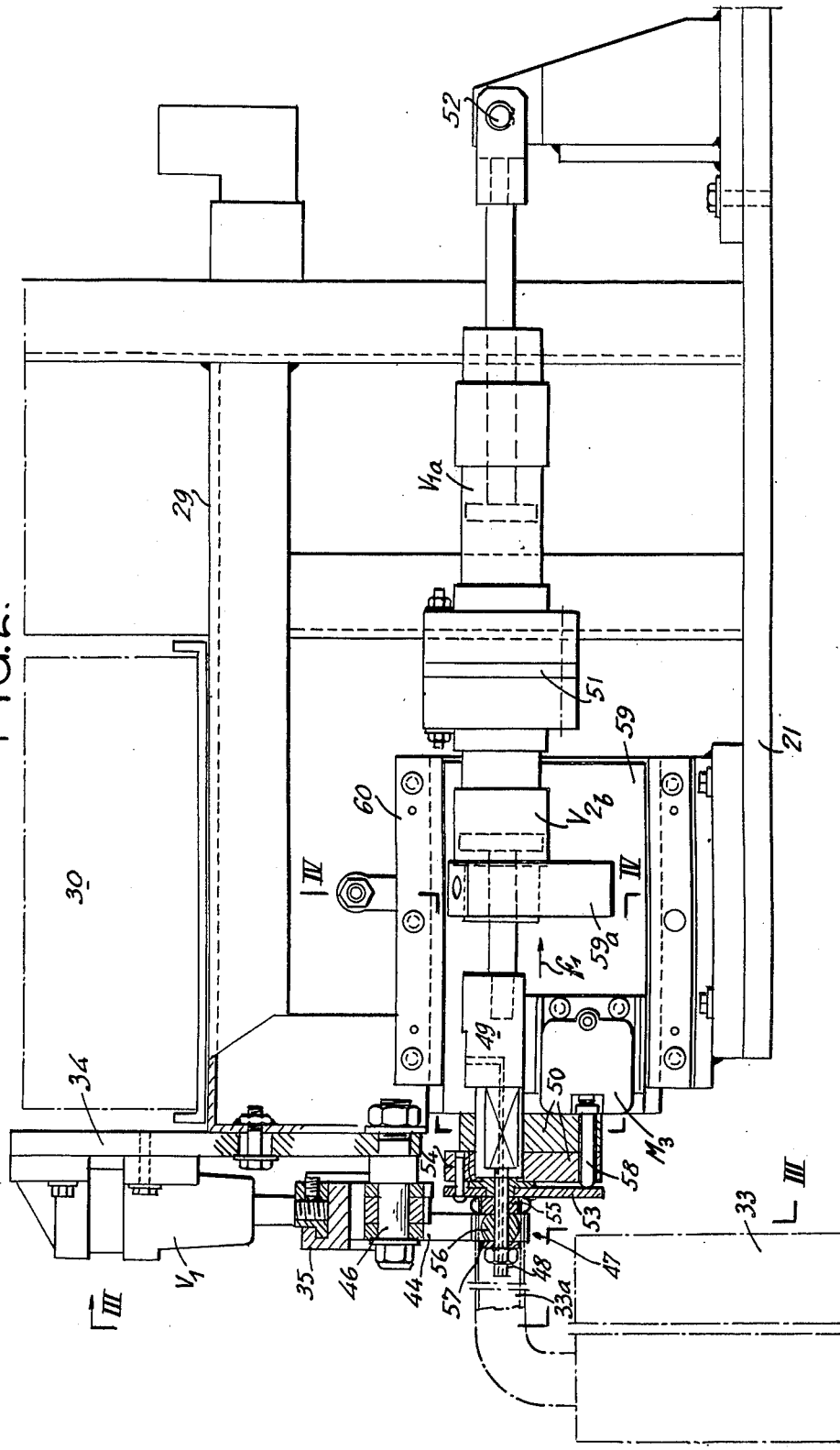

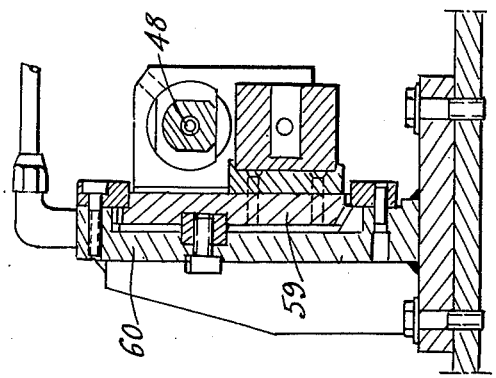
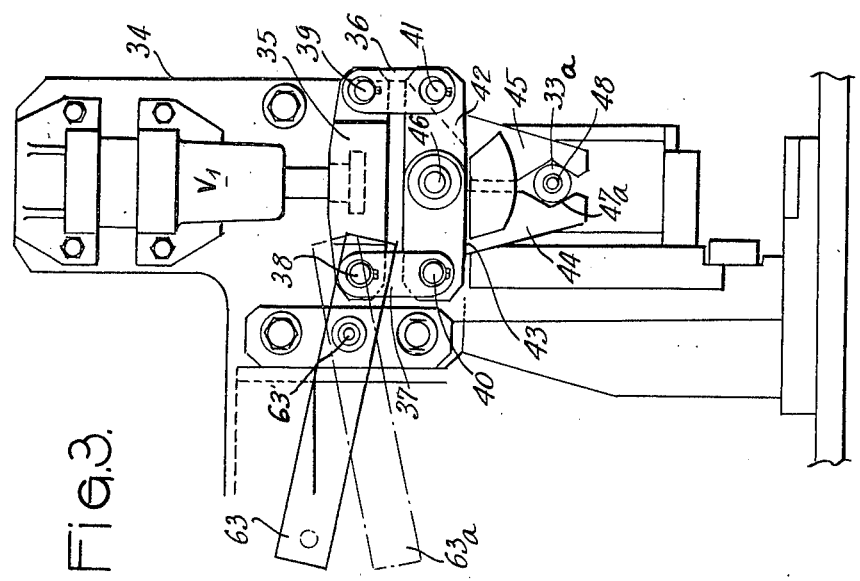

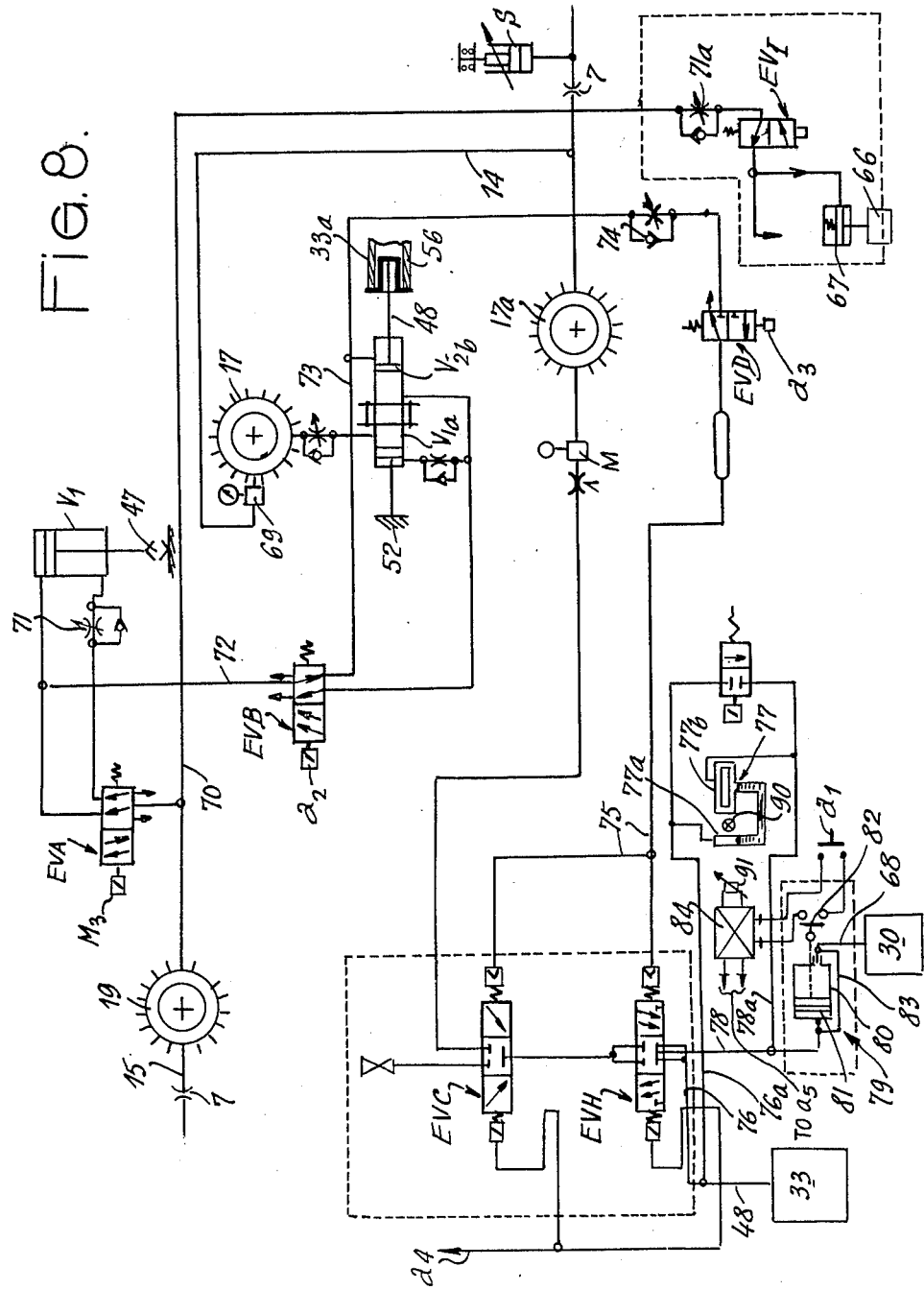

SELF-OPERATING MACHINE FOR DRY TEST OF HOLLOW BODIES OF THE HEAT EXCHANGER TYPE AND THE LIKE

The present invention relates to an automatic machine for testing hollow bodies of the heat exchanger type and the like.

Applicant has already shown a method for testing hollow bodies of the heat exchanger type wherein a reference heat exchanger known for its good tightness, and a heat exchanger to be tested, are simultaneously supplied with compressed air, then isolated from the source of compressed air for a significant period of time during which said two heat exchangers are connected to the two inlets of a differential manometer.

The state of the differential manometer, at the end of said period of time, is indicative of whether the heat exchanger to be tested leaks or not.

For the test to be really valuable, it has been found suitable that the reference heat exchanger be of a same nature as and, if possible, identical to the heat exchanger to be tested, to prevent disturbing factors, such as differences of volume between the two heat exchangers or differences in their heat exchange capacity from adversely affecting the test.

Because of the very short period of time, about a few seconds, which is necessary to test heat exchangers according to the above mentioned method, it has appeared possible to submit all the heat exchangers coming from a mass production line to a tightness test instead of performing only selective tests on a few heat exchangers as it was usual before. However, it has appeared that the practical embodiment of the above mentioned method could be difficult to realize when several thousands of heat exchangers have to be tested in a single working day. In fact, in heat exchanger manufacturing lines, there are manufactured heat exchangers of substantially different characteristics both with respect to inner capacity and shape. The manufactured units are thus different during a working day and from one day to another. This practical difficulty would normally lead one to design various machines, each comprising a reference heat exchanger corresponding to the various heat exchangers being manufactured. However, in such a case it would become a requirement to direct towards the various machines only one type of heat exchanger, and then some of the testing machines would be utilized below their working capacity while other machines would be overloaded at some hours. Besides, each machine would necessarily have to be fed permanently by an operator.

SUMMARY OF THE INVENTION

The present invention creates a new machine comprising a great number of working stations of a realization enabling them to be used for the test of heat exchangers or other hollow bodies of any type since in order to adapt them to one type or to another type of heat exchanger, it is only necessary to change the reference heat exchanger which is provided at each station. Besides, the machine will incidentally identify by itself among all the stations which station eventually is not provided with a heat exchanger to be tested. That station will then be automatically made inoperative without any manual intervention.

Further, because of its design, the machine cannot indicate as being "good" a heat exchanger which would have leaks, even minor ones. Actually, any faulty placing of a heat exchanger and also any incident occuring to the machine itself will result in an indication that the heat exchangers under test are bad.

Furthermore, the machine enables one to know at any moment the total number of heat exchangers which have been tested in a predetermined period of time and also the number of heat exchangers respectively declared "good" and "bad."

According to the invention, the machine comprises a plurality of units, each having a support for a reference hollow body and for the hollow body to be tested, a first set of caps for closing all apertures but one of each of the hollow bodies whereby one aperture remains free for each of the hollow bodies, a further first set of caps for coupling the free apertures of each of said reference hollow bodies to a common distribution test compressed gaseous fluid supply, a further second set of caps associated with carrier means for coupling the free apertures of each of said hollow bodies to be tested and carried by said carrier means to said common distributing test compressed gaseous fluid supply, a differential manometer having two inputs each respectively connected to one of said further first and second sets of caps, a rotatable table supporting said plurality of units positioned in spaced relationship along the periphery thereof, arcuate controlling means mounted in relation with said table, means for rotating said table at a substantially constant speed and means engaging said arcuate controlling means and causing simultaneously connection of said reference hollow bodies and hollow bodies to be tested with said compressed test gaseous fluid supply, then isolating simultaneously said reference hollow bodies and hollow bodies to be tested from said test gaseous fluid supply and then connecting simultaneously said reference hollow bodies and hollow bodies to be tested respectively to the two inputs of said differential manometer, means coupled to said carrier for reading said differential manometer for detecting a leak and for operating said carrier for releasing thereof upon detection of a leak, thus causing dropping of said tested hollow body having a leak in a first position, and operating means angularly spaced with respect to said means for reading said differential manometer for releasing said carriers carrying tested hollow bodies which do not have leaks, whereby said latter hollow bodies are dropped in a second position.

Various other features of the invention will become apparent from the following detailed description.

BRIEF DESCRIPTION OF THE DRAWINGS

An embodiment of the invention is shown by way of non-restrictive example in the accompanying drawings, wherein:

FIG. 2 is an enlarged partly sectional top view of a detail of FIG. 1.

FIG. 3 is a fragmentary top view taken along line III—III of FIG. 2.

FIG. 4 is a sectional view taken substantially along the line IV—IV of FIG. 2.

FIG. 8 is a diagram showing the operation of the machine.

Detailed Description of Illustrated Embodiments

Figure 1:
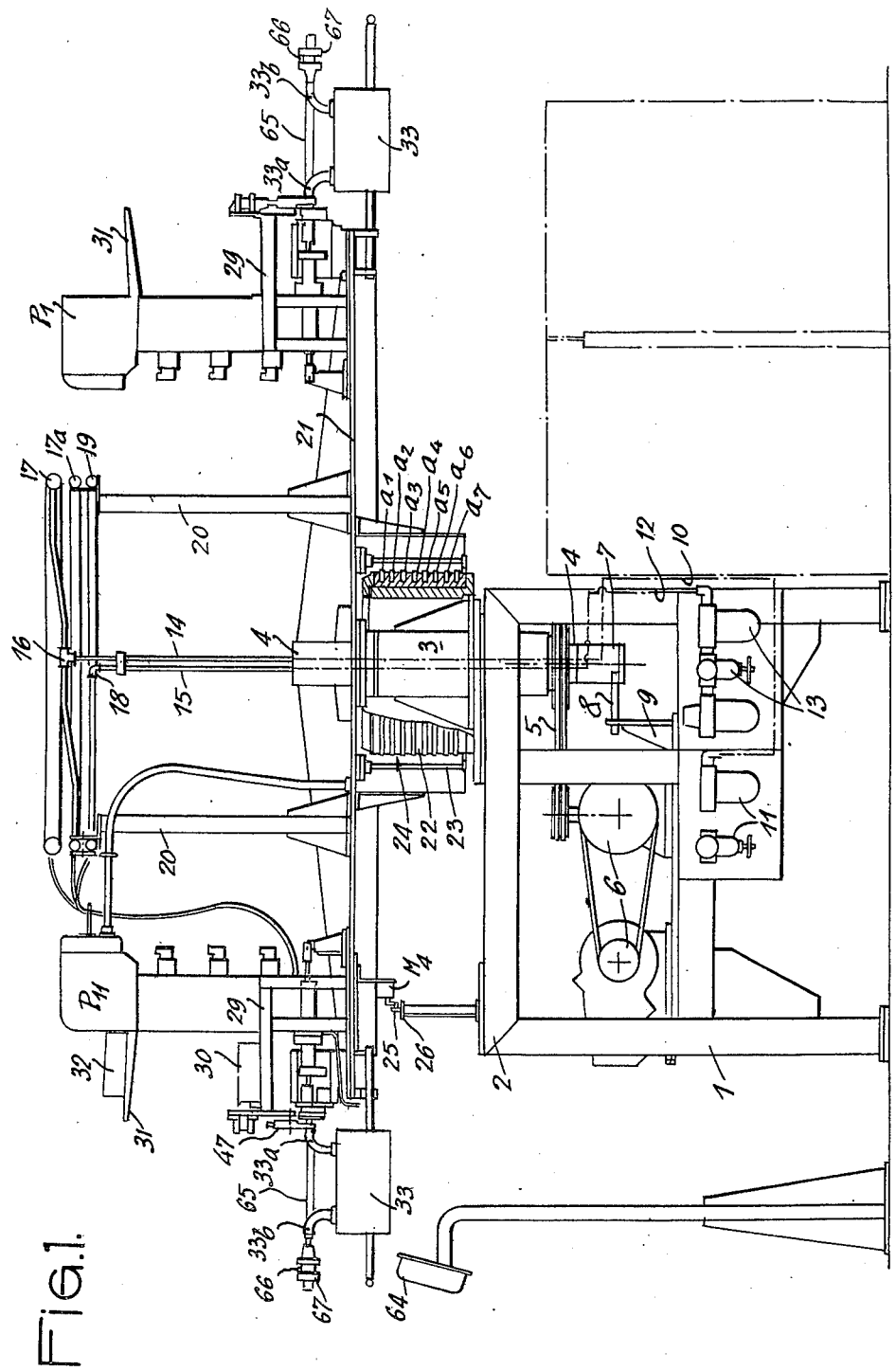
FIG. 1 is a partly exploded top view of a testing machine with multiple working stations, according to the invention.

Referring to FIG. 1, a frame 1 has a plate 2 on its top, said plate supporting a body 3 containing a ball thrust bearing for a hollow shaft 4 protruding on each side of said body 3 and which is rotatably driven through belts 5 by means of a motor unit 6.

At its lower portion below the plate 2, the shaft 4 supports a sleeve 7 which is maintained by a finger 8 retained by a stop 9. The sleeve 7 constitutes the outer envelope of a rotary joint. The sleeve 7 is connected through a pipe 10 to a supply unit 11 of filtered dry air without lubricant and through a pipe 12 to a supply unit 13 of air or other gas containing a lubricant in suspension. The rotary joint, of which the sleeve 7 constitutes a portion, is connected, inside the hollow shaft 4, to a duct 14 supplying non-lubricated air and to a duct 15 supplying lubricated air.

A T-coupling 16 connects the duct 14 to two ring-shaped manifolds 17, 17a, for the distribution of the non-lubricated air, and an elbow pipe fitting 18 connects the duct 15 to a manifold 19 supplying the lubricated air.

The manifolds 17, 17a and 19 are supported by pillars 20 which are placed on the top of a table 21 supported by the shaft 4 and consequently rotatably driven by said shaft.

The plate 2 supports, around the body 3, a collector device 22 constituted by a stack of conducting rings $a_1-a_7$ separated from each other by joints made of electrically insulating material.

As explained herein below, some of the conducting rings $a_1-a_7$ do not extend about the whole periphery of the collector 22, but only extend about a portion of the circle.

In the illustrated example the rotary table 21 supports, near its periphery, eighteen testing stations which are referenced $P_1-P_{18}$. In FIG. 1 only the stations $P_1$ and $P_{11}$ are shown.

Each station is electrically connected by cables (not illustrated) to a bar 23 placed below the table 21 near the collector 22 and each of the bars supports a set of seven brushes 24 designed for bearing on the rings or ring segments $a_1-a_7$ respectively.

As should now be apparent each cycle of the machine corresponds to a complete rotation of its rotary table 21 and, during this complete rotation, each of the brushes 24 of each bar 23 is in contact with the corresponding conducting rings or segments of conducting ring of the collector 22 to control some operations of the working cycle as hereinbelow described. Electric current is of course supplied to the rings $a_1-a_7$ by appropriate conductors placed inside the collector 22 without any difficulty since said rings are fixedly mounted.

Figure 5:
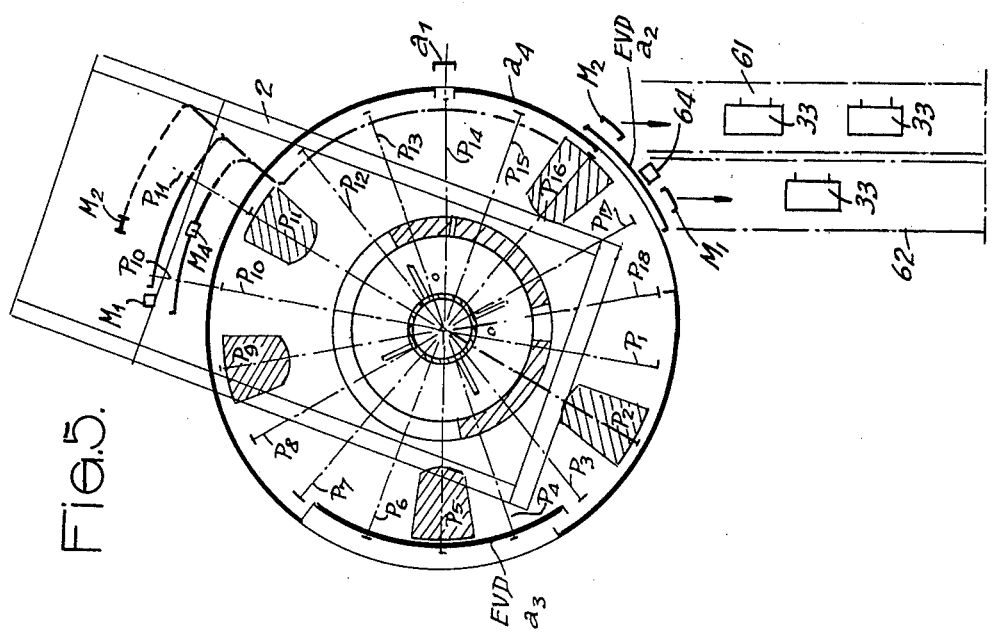
FIG. 5 is an explanatory diagrammatic plan view.

Other operations which have to be performed at each working station are controlled by micro-switches or contacts such as the contact $M_4$ shown in FIG. 1. These contacts are fixedly mounted below the rotary table 11 and are provided with a slider or roller 25 moving on fixed tracks 26 supported by the frame top plate 2 and having in various places, which will be defined hereinbelow, some protuberances forming control cams. For manufacturing purposes the contacts of a station can be angularly off-set with respect to the place where they must work, which is shown in FIG. 5 wherein the contacts $M_1$, $M_2$ and $M_4$ are referenced twice, first at their waiting position, secondly at their operational position.

Figure 6:
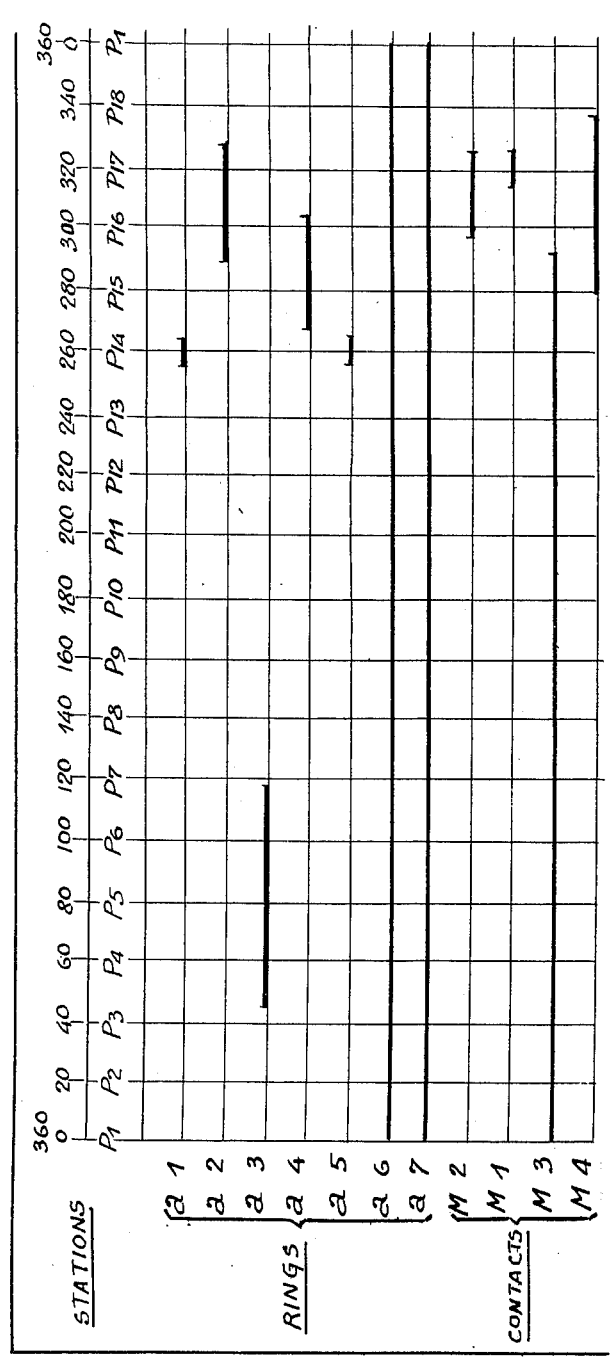
FIG. 6 is a diagram showing the position of some control elements of the machine.

FIG. 6 shows the conducting rings $a_1-a_7$ are distributed in relation to each other and in front of the stations $P_1-P_{18}$ when the station $P_1$ is at the starting position of the cycle.

FIG. 6 also shows, at its lower portion, the development and the angular operative place of the protuberances or cams supported by the track 26 and controlling the working position of the contacts $M_1$ to $M_4$ which are described below.

Figure 7:
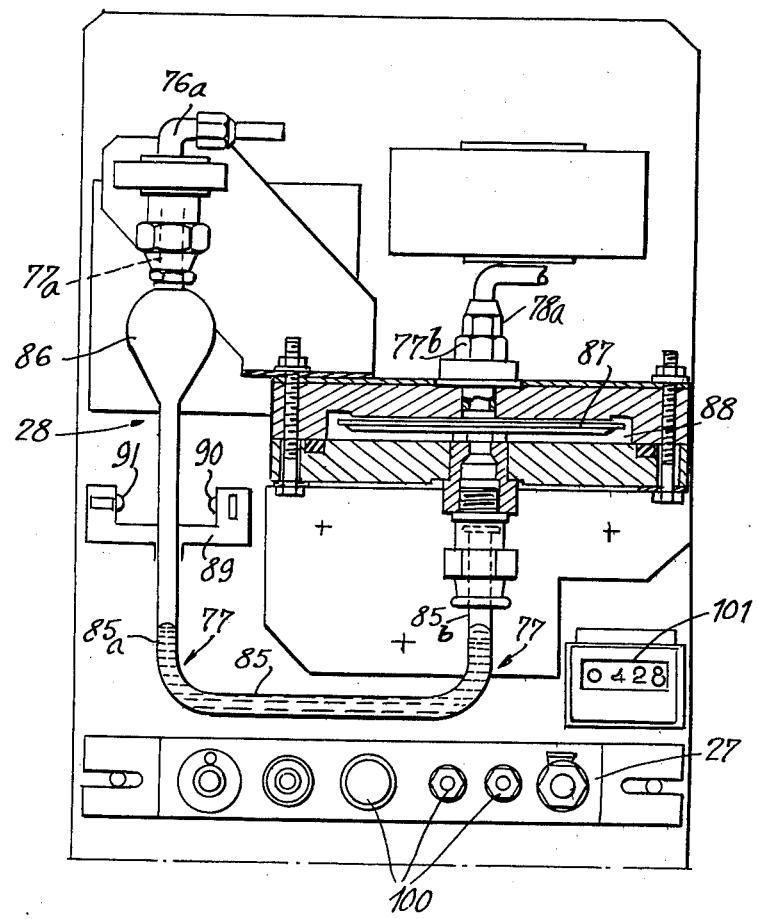
FIG. 7 is a partial top view of one of the working stations of the machine.

The working stations $P_1-P_{18}$ are in the shape of cabinets delimiting on their front side, as shown in FIG. 7, a panel 27 with various warning lights as well as a differential manometer 28. Further, each cabinet forms, close to its lower portion, a bracket 29 supporting a hollow apparatus 30 (FIG. 1), for example a heat exchanger. A second bracket 31 is provided to support a second heat exchanger 32 of a same type as the heat exchanger 30. The heat exchanger 32 will be tested during a next cycle of the machine and is placed on the bracket 31 in a waiting position in view of being exactly in the same heat exchange conditions as the reference heat exchanger 30 for a sufficient period of time for its temperature be equalized with that of the reference heat exchanger 30 before being submitted to the test and in order to prevent any chance of measuring error during said test.

The various heat exchangers to be tested at each station are designated by 33 and are supported, as shown in FIG. 1, in the vicinity of the reference heat exchangers 30.

As shown in FIGS. 2 and 3, the front part of each bracket 29 supports a plate 34 on which is placed a jack $V_1$ having a rod connected by a cross-piece 35 to two small rods 36, 37 pivotally mounted on spindles 38, 39. The small rods 36, 37 control, through pivots 40, 41, operational arms 42, 43 of jaws 44, 45 pivotally mounted on a spindle 46, said jaws forming a gripper 47 (FIG. 2) which is designed to hold one of the pipes 33a of a heat exchanger 33 to be tested.

A tube 48 for the supply of the testing compressed air passes axially through the gripper 47. The tube 48 is placed in a slide block 49 guided by plates 50 and slide block 49 is connected to the rod of a in turn $V_{2b}$ which in turn is connected through a coupling sleeve 51, to a second jack $V_{1a}$ aligned with the jack $V_{2b}$ the piston rod of jack $V_{1a}$ being connected to a fixed point 52.

The jack $V_{2b}$ has a short stroke, for example about 10 mm. The jack $V_{1a}$ has a longer stroke, for example about 35 mm, this stroke corresponding at least to the length of the portion of tube 48 which is engaged into the pipe 33a of the heat exchanger 33.

The protruding portion of the tube 48 passes through a plate 53 which is guided on fingers 54 in order to be slidable. Said plate 53 constitutes a bearing for a pressure washer 55 against which is applied a distortable packing 56 held by a washer and a nut 57. The plate 53 bears on a rod 58 crossing the plates 50 and bearing against the operational component of a contact $M_3$.

The above described arrangement is designed to provide the following operations: when the pipe 33a brought is to surround the tube 48, said pipe 33a fits the distortable packing 56 and its end bears against the plate 53. By pushing said plate at the end of the pipe engaging stroke, the contact $M_3$ is operated and, through an electro-valve which is described hereinbelow, the jack $V_{2b}$ is fed and its piston rod then slides in the direction of arrow $f_1$. This has for its effect to compress and distort the resilient packing 56 inside the pipe 33a which is thus tightly closed. At the same time, the plate 53 holds the rod 58 in a position to operate the contact $M_3$ and it can be noticed, while referring to FIG. 6, that the operation of said contact $M_3$ remains effective during the main portion of the machine cycle.

The assembly formed by the jack $V_{1a}$, sleeve 51, contact $M_3$, plate 50 and jack $V_{2b}$ is supported and guided by a sliding plate 59 which is itself guided in a track 60 placed on the top of the rotary table 21. The plate 59 is connected to the body of jack $V_{2b}$ by a member 59a. When the jack $V_{2b}$ is not fed, the packing 56 is not distorted, and the assembly comprising the plate 59 and the elements supported thereby can be slided according to the arrow $f_1$ under the action of the long stroke jack $V_{1a}$. It becomes then possible to completely remove the tube 48 and the packing 56 from the pipe 33a, which is made, as explained hereinbelow, just before the end of the working cycle. Then, by also supplying the jack $V_1$ in a way to cause opening of the gripper 47, the heat exchanger 33 is no longer maintained and thus falls down by gravity.

FIG. 5 shows that the drop of the heat exchanger occurs either at the station $P_{16}$ if the exchanger is considered as being "bad," in which case it is picked up by a carrier 61, or at the station $P_{17}$ if the exchanger is "good" and, in which case it is picked up on a carrier 62. In all cases, retraction of the tube 48 and of the distortable packing 56 (FIG. 2) is made before opening the gripper 47.

FIG. 3 shows that the jack $V_1$ is also utilized to operate a rotary lever 63 which is hinged on a spindle 63' and on the spindle 38 of the cross piece 35. The lever is in the position shown in full line as long as the gripper is closed and, on the contrary, it is brought to position represented in chain lines (63a in FIG. 3) when the gripper is open, which means after operation of the jacks $V_1$ to release the heat exchanger 33, either at the station $P_{16}$ or at the station $P_{17}$ (Stations considered as reference stations when the station $P_1$ is at the start of the cycle).

It is thus possible to place, between the positions of the stations $P_{16}$ and $P_{17}$, a marking device 64 which is diagrammatically shown in FIG. 5 and sketched in FIG. 1. This marking device is, for example, constituted by a painting gun, the operation of which is controlled by the lever 63 when it is in the position represented in full line in FIG. 3, that is when the heat exchanger has been considered as being "good" by the test and that it is to be released on the carrier 62. In most cases, each heat exchanger comprises at least two pipes, and it is of course necessary that all pipes be tightly closed before supplying the testing compressed air into said heat exchangers through the pipe 48. To ensure this closing, usually all the pipes or other apertures of the heat exchanger are provided with closing caps which may be independent from the machine. In many cases, however, for example when the heat exchangers are constituted by heating radiators for vehicles, they only comprise two pipes. In such case it is provided on the machine that the closing of the second pipe, designated at 33b in FIG. 1, be performed at the same time that the heat exchanger is placed on the end of tube 48.

For closing said second pipe, that some at least of the working stations are provided with supporting arms 65 protruding beyond the rotary table 21, the supporting arm being provided with an air operated sliding cap 66, which means that it comprises a distortable packing similar to the packing 56, said packing being introduced into the second pipe 33b to be distorted therein upon operation of a jack 67 (FIGS. 1 and 8).

Eventuaally, Eventually, more than a second pipe must be closed, it is then possible to provide, at least at some stations of the machine, a plurality of caps 66 and a plurality of parallel fed control jacks 67.

The reference heat exchanger 30, which is similar to and preferably identical to the heat exchangers 33 to be tested at a determined working station, is closed in the same way by tight closing caps which are not illustrated in order not to complicate the drawings, one of said caps being crossed through by a tube 68 (FIG.8) for supplying thereto the testing compressed air.

The cabinet of each working station $P_1$—$P_{18}$ is connected, as herein before explained, to each of the manifolds 19 for the supply of greased air and respectively 17, 17a for the supply of the dry air.

FIG. 8 shows in a diagrammatic way the above manifolds which are themselves respectively supplied from the air supply units 11 and 13 through the ducts 14 and 15. The dry air fed by the manifolds 17, 17a being used for testing the heat exchangers, it is important that the dry air be really supplied. For that purpose the machine comprises, upstream of the manifolds 17, 17a, a safety pressostatic valve S (FIG.8) which is designed to immediately stop the machine in case of a lack of air, typically by stopping the supply to the motor unit 6 driving the rotary table 21.

The pressure at the inlet of the manifolds 17, 17a is also permanently checked by a manometer 69 placed upstream of the manifold 17 and the indications of which appear on a general panel checking the operation of the machine.

The lubricated air coming from the manifold 17 is fed through a duct 70 to a first electro-valve EVA which is controlled by the contact $M_3$ (FIG. 2) of which the closing is ensured upon positioning a heat exchanger to be tested. Supplying electric current to the contact $M_3$ is ensured by the rings $a_6$ and $a_7$ which are continuous rings as shown in FIG.6.

The electro-valve EVA has two states: a working state and a draining off state, the working state being the illustrated state of the electro-valve EVA and for which the jack $V_1$ is fed to close the gripper 47 holding the pipe of the heat exchanger 33 to be tested. If required, an adjustable pressure regulator 71 is placed between the electro-valve EVA and the jack $V_1$. The duct 70 is also connected, through a pressure regulator 71a, to a second electro-valve EVI having also two states, a working state and a draining off state, and which is used to feed the jack 67, acting on the cap or caps 66 for closing the pipe or pipes of the heat exchanger 33 to be tested.

The electro-valve EVI is manually controlled for being set in the working state or closing position and is controlled by the ring $a_2$ for its draining off state or it is controlled by the contact $M_3$ for its closing and by the ring $a_2$ for its draining off states.

The working outlet of the electro-valve EVA is connected by a duct 72 to an electro-valve EVB with two positions: a working position and a draining off position. In the working position which is illustrated, the jack $V_{2b}$ is fed and the jack $V_{1a}$ is drained off. Then the resilient packing 56 is distorted ensuring tightness between the pipe 33a of the heat exchanger to be tested and the testing air supplying tube 48 which corresponds to the position appearing in FIG.2. In the other position of the electro-valve EVB, the jack $V_{2b}$ is drained off and the jack $V_{1a}$ is fed, which corresponds to the retraction position of the tube 48 from the pipe 33a. The control of the electro-valve EVB is ensured upon rotation of the table 21 by the ring $a_2$ which extends on an arc of a circle comprised of between about 290° and 330° from the start of the cycle, as shown in FIG.6.

It is to be noted that the operation of the valve EVB is independent of the result of the tightness test of the heat exchanger 33, and that said operation occurs during a rotation amplitude of the table which starts before the position of the station $P_{16}$ and which ends after the position of the station $P_{17}$ (FIGS. 5 and 6). Thus the tube 48 is always retracted when the gripper 47 releases the heat exchanger to be picked up by the carrier 61 or the carrier 62 depending on whether it is considered as being "bad" or "good."

The lubricated air coming from the electro-valve EVB in its working position and sent to the jack $V_{2b}$ through the duct 73 is also sent through said duct to a flow regulator 74 and to an electro-valve EVD illustrated in FIG. 8 in a rest position. The working state of the electro-valve EVD is controlled by the ring $a_3$ having an active portion extending on an angular opening substantially comprised of between 45° and 115° from the original position, as shown in FIG. 6, which corresponds to the initial position of the working stations $P_3$—$P_7$.

The electro-valve EVD controls through ducts 75 the working positioning of two electro-valves EVC and EVH having three positions i.e.: working, neutral and draining off. The outlet of the electro-valve EVC is connected to the inlet of the electro-valve EVH and the outlet of said electro-valve EVH is connected through a duct 76 to the tube 48 entering the heat exchanger 33 to be tested. The duct 76 is connected through a duct 76a to one inlet 77a of the differential manometer 77.

The outlet of the electro-valve EVH is also connected through a duct 78 to the duct 68 leading to the reference heat exchanger 30 but through a pressure checker generally shown at 79. A duct 78a of the duct 78 leads to the second inlet 77b of the differential manometer 77.

The pressure checker 79 is constituted by a cylinder 80 in which is placed a piston 81 controlling a switch 82. The cylinder 80 is by-passed by a shunt 83 with a heavy loss of pressure to enable motion of the piston in said cylinder which is connected to the tube 68 for the supply of the testing compressed air to the reference heat exchanger 30.

When the electro-valves EVC and EVH controlled by the electro-valve EVD are supplied with air, then the compressed air, coming from the manifold 17a and having a pressure which is set by an adjustable pressure reducing manometer M, is fed, on one hand directly to the heat exchanger 33 to be tested and to the first inlet 77a of the differential manometer 77 and, on the other hand, directly to the second inlet 77b of the differential manometer and to the cylinder 80, which has for its effect to cause the piston 81 of the pressure checker 79 to slide which closes the switch 82. The testing air is thus fed to the reference heat exchanger 30.

Closing the switch 82 ensures that the testing air has actually been supplied into the reference heat exchanger 30 and said switch 82 constitutes a first relay for stopping the supply of an amplifier 84, preferably of the threshold type and the final supply of which is ensured by a second relay constituted by the ring $a_1$ which, as shown in FIGS. 5 and 6, extends on an angular aperture from about ten degrees to about 260° of the cycle.

FIGS. 7 and 8 show that the differential manometer 77 placed in each cabinet comprises a U-tube 85 of which at least the upwards leg 85a is transparent. The end of the leg 85a emerges in a bulb 86 forming the inlet 77a of the manometer and to which is connected the duct 76a. The other leg 85b emerges in a distortable diaphragm case 87 placed in a chamber 88 forming the second inlet 77b connected to the duct 78a.

A tinted fluid is poured in the tube 85 and an adjustable support 89 in placed against the leg 85a to support a light source 90 and a photoelectric cell 91 of which the output is connected to the amplifier 84.

When the reference heat exchanger 30 and the heat exchanger 33 to be tested are filled with compressed gas and isolated by the electro-valve EVH (position as shown in FIG. 8), if the heat exchanger 33 is air tight, then the liquid does not raise enough in the leg 85a of the manometer to interrupt the light ray of the source 90.

Figure 9:
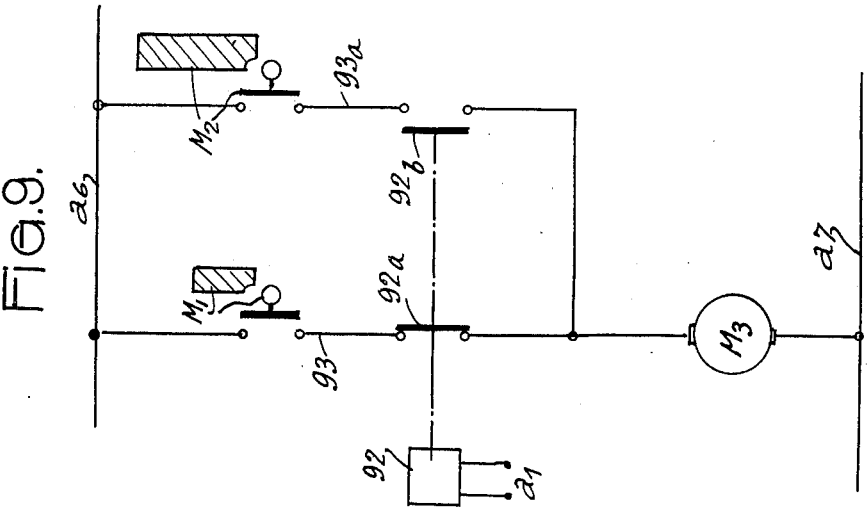
FIG. 9 is a fragmentary diagram of a memory with which the machine is provided.

In that case, when the working station supporting the reference heat exchanger 30 and the heat exchanger 33 under test reaches the position of ring $a_1$ (FIGS. 5 and 6) (said ring extending on about ten degrees), the amplifier 84 is fed and "reads" the information coming from the cell 91. This information which corresponds to the state "good" or "leakproof" of the heat exchanger 33 is transmitted through the amplifier 84, which is common to all stations, to the ring $a_5$ of which the conducting portion is in coincidence, as shown in FIG. 6, with that of the ring $a_1$ which supplies the amplifier. The information received by the ring $a_5$ is transmitted to a bistable relay 92 (FIG. 9) which is placed in the cabinet of the considered station, said relay then closing a first contact 92a of a circuit 93 in which is serially mounted the contact $M'_3$ controlling the electro-valve EVA.

On the contrary, if the heat exchanger 33 leaks, then the pressure in the reference heat exchanger 30 is dominant and this pressure causes the fluid to rise in the leg 85a of the differential manometer 77. The fluid then intercepts the light ray of the source 30 and acts as an optical amplifier. The information received by the cell 91 is then sufficient to be beyond the threshold of the amplifier 84 which does not transmit any information at the moment of its voltage supply through the ring $a_1$. Consequently, in that case a pulse is not transmitted through the ring $a_5$ to the relay 92 of FIG. 9, and the circuit 93 remains open while the circuit 93a remains closed. The circuit 93a is connected, as is the circuit 93, to the contact $M_3$.

Each of said two circuits 93 and 93a is, besides, provided with a switch contact $M_1$, respectively $M_2$, fixed under the rotary table 21 like the contact $M_4$ shown in FIG. 1 and consequently running on the track 26 which is, as illustrated in FIG. 6, provided with a portion of a cam extending to act between 300° and 325° with respect to the contact $M_2$ and about between 315° and 325° with respect to the contact $M_1$. With regard to the construction, the valves operating the contacts $M_1$ and $M_2$ can be offset as shown by $M'_1$ in FIG. 5 which enables only one track 26 to be used.

Considering what has been previously described, if the radiator is "good" and if the relay 92 has been excited, the circuit 93 is partially closed. When the contact $M_1$ reaches its cam at about 315°, it is closed, and consequently the contact $M_3$ drops, thus causing opening of the gripper 47 and consequently the drop of the heat exchanger 33 on the carrier 62 (FIG. 5).

The previously occured closing of the contact $M_2$ had no effect since the contact 92b was already maintaining open the circuit 93a. On the contrary, if the heat exchanger 33 is "bad" or leaking, the relay 92, having not been excited and the contact 92b having remained closed, closing of the contact $M_2$ which occurs before that of the contact $M_1$, causes the contact $M_3$ to drop, thereby causing the opening of the gripper at about 300°, which means at the level of the station $P_{16}$ as shown in FIG. 5, and then the heat exchanger 33 is received by the carrier 61.

It is noted from the above disclosure that the circuits 93, 93a will act as a memory having registered the reading previously made by the photo-electric cell 91. This memory circuit, as well as the way of feeding the amplifier and the other described means, ensures that in no case a heat exchanger can be recognized as being "good" if it is not good. Actually it has been found that for supplying the amplifier 84 it was necessary that the switch 82 be closed, it was also necessary that current will arrive on the ring $a_1$, and it was also necessary that both the light source 90 and the cell 91 work as well as the amplifier circuits since it is required, for a heat exchanger to be declared as being "good" that said amplifier does not reach the threshold which causes operating of the relay 92.

It is of course necessary that the heat exchangers 30 and 33 be drained off of the testing compressed air before being dropped on the carrier 61 for the "bad" ones or on the carrier 62 for the "good" ones. For that purpose the ring $a_4$ (FIGS. 5 and 6) has a conducting section between about 270° and 300° of the cycle and this ring $a_4$ is connected to the electro-valves EVC and EVH to bring them to their draining off position.

Referring again to FIG. 5, it is seen that the complete testing cycle is in fact smaller than one rotation of 360° of the table 21 since, in fact, said testing cycle starts only after a working positioning of the electro-valve EVD which parallely controls and with some delay the electrovalves EVC and EVH for the supplying of the testing compressed air. Consequently, for the positioning of the heat exchangers 33 there is designed an angular opening extending from the carrier 62 up to an angular position slightly after applying voltage to the electro-valve EVD, i.e.: there is provided a loading availability of about 60°.

It should be apparent from the above that the operations are, after the loading step, completely automatic for each of the stations. These operations can be further explained as follows:

manual loading causing, by actuation of the contact $M_3$, the closing of the gripper 47, then through the electro-valve EVB, the inflating of the tightening packing 56 with a small delay and the inflating of the closing caps 66 through the electro-valve EVI, admission of the testing compressed air through the electro-valves EVC and EVH set in their working position through the ring $a_3$ and the electro-valve EVD, isolation between each other of the reference heat exchanger and the heat exchanger to be tested, and setting in communication with the differential manometer upon the end of the ring $a_3$, which corresponds to the longest portion of the cycle as illustrated by the heavy line in FIG. 5, which extends just before the station $P_7$ up to the station $P_{14}$, reading and memorizing the information coming from the differential manometer through the rings $a_1$, $a_5$ and the relay 92, draining off of the reference heat exchanger and the exchanger to be tested controlled by the ring $a_4$ and the electro-valves EVH and EVC, draining off the closing caps by the electro-valve EVI, draining off the caps supplying the testing compressed air and retraction these caps by means of the electro-valve EVD controlled by the ring $a_2$, controlling the opening of the gripper 47 through the contacts $M_1$ or $M_2$, which besides annuls or cancels the memory.

It is remarkable to notice that in the case when one or several of the eighteen working stations of the machine would not be provided with a heat exchanger to be tested, then the contact $M_3$ would not be operated since it can only be operated by placing a heat exchanger to be tested at the station. In that case, the electro-valve EVA would not be brought to its working position and, consequently the different air-operated circuits of the machines, described with reference to FIG. 8 and relating to the non-loaded station, would remain inoperative since their operation is related to the working position of the electro-valve EVA downstream of which is connected the duct 72 for feeding of electro-valve EVB.

In addition to the means as above described and required for the operation of the machine, said machine comprises various other secondary devices and especially it is advantageous that the state of operation be controlled or monitored by various warning lights as that indicated as examples at 100 in FIG. 7. Further, at least one counter 101 can be designed in view of registering one unit each time a contact $M_4$ (FIG. 1) passes on a cam of the track 26 and simultaneously a second contact is closed by the operation of the contact $M_3$ which is connected to voltage by the engagement of a heat exchanger to be tested. Still further, it is also possible to count the "good" radiators and this can be accomplished by means of a counter (not illustrated) controlled from a pulse coming from the memory relay 92.

The invention is not restricted to the embodiment shown and described in detail, for various modifications thereof can moreover be applied thereto without departing from the scope of the invention as defined in the appended claims.

I claim:

1. A machine for detecting leaks in hollow bodies, by testing each hollow body by comparison with an identical reference hollow body, hollow bodies of different kinds being tested simultaneously and each hollow body having at least two apertures, comprising:

a plurality of units, each having a support and carrier means for a reference hollow body and for the hollow body to be tested;

a first set of caps for closing all apertures but one of each of the hollow bodies whereby one aperture remains free for each of the hollow bodies;

a further first set of caps for connecting said free apertures of each of said reference hollow bodies to a common distributing test compressed gaseous fluid supply;

a further second set of caps associated with said carrier means for connecting said free aperture of each of said hollow bodies to be tested and carried by said carrier means to said common distributing test compressed gas fluid supply;

a differential manometer having two inputs each respectively connected to one of said further first and further second sets of caps;

a rotatable table supporting said plurality of units, said units being positioned in spaced relationship along the periphery of said rotatable table;

arcuate controlling means operatively coupled with said table;

means for rotating said table at a substantially constant speed;

means engaging said arcuate controlling means for simultaneously coupling said reference hollow bodies and hollow bodies to be tested with said compressed test gas fluid supply and for then simultaneously isolating said reference hollow bodies and hollow bodies to be tested from said test compressed gas fluid supply and simultaneously coupling said reference hollow bodies and hollow bodies to be tested respectively to the two inputs of said differential manometer;

means operatively coupled to said differential manometer for reading said differential manometer and operated from said differential manometer in response to a leak detected thereby, said reading means operating said carrier means for releasing thereof thus causing dropping of said tested hollow body in which a leak is detected in a first position; and operating means angularly spaced with respect to said means for reading said differential manometer for releasing said carrier means carrying tested hollow bodies which are determined to be leak-proof so as to drop said latter leak-proof hollow bodies in a second position.

2. Machine according to claim 1, wherein said carrier means comprises at least one gripper to hold a hollow body; a first air cylinder controlling said gripper; and a switch for operating said first cylinder; said cap closing the aperture of said hollow body under test and applying voltage to said switch.

3. Machine according to claim 2 wherein said cap for closing said aperture of each of said hollow bodies comprises a distortable packing maintained between two sliding bearing washers, said machine including a second air cylinder controlled in time relation with said first air cylinder operatively coupled to said cap to cause deformation of said packing within said aperture.

4. Machine according to claim 3 comprising a pipe in which is inserted in said distortable packing of said cap, and wherein said gripper surrounds said pipe which is connected to the aperture of the hollow body and which is inserted in the distortable packing of the cap, said cap being crossed through by a tube on which are mounted said bearing washers, said tube being connected, on one hand, to a duct connected to the test compressed gas fluid supply for feeding the test compressed gaseous fluid to the hollow body, and on the other hand, to said second air cylinder, said second air cylinder being slidably mounted and connected to a third air cylinder connected to the cap for operation thereof and for removing said cap following operation of said second air cylinder in a direction to stop deforming of said packing.

5. Machine according to claim 4, wherein said switch is controlled by placing the hollow body on a carrier means, and further comprising a first electro-valve controlled by said switch for controlling operation of said first air cylinder for controlling said grippers and said caps, whereby said unit will only operate if said unit is provided with a hollow body to be tested.

6. Machine according to claim 5, comprising a second electro-valve for controlling the operation of said second air cylinder and of said third air cylinder which respectively control the distortable packing of the cap and the removing of said cap, said second electro-valve being connected to the output of said first electro-valve operated by said switch controlled by placing the hollow body, said second electro-valve being coupled to and controlled by said arcuate controlling means.

7. Machine according to claim 6, wherein said arcuate controlling means includes a plurality of rings coupled to said table.

8. Machine according to claim 7, comprising two serially mounted distributing electro-valves for controlling the test compressed gas fluid being supplied and evacuated from the hollow body to be tested as well as from the reference hollow body, said two serially mounted distributing electro-valves being simultaneously controlled to supply the test compressed gaseous fluid by means of a drive electro-valve fed in operating air through the second electro-valve controlling both said second air cylinder and said third air cylinder, said drive electro-valve being itself controlled through one ring of said arcuate controlling means and said two serially mounted distributing electro-valves being controlled to evacuate the hollow body under test and the reference hollow body through a second ring of said arcuate controlling means, said first and second rings being angularly spaced from each other by an angular distance corresponding to a rotation angle of the table for which said two distributing electro-valves maintain the hollow body under test and the reference hollow body isolated from said test compressed gas fluid supply and connected with the two inputs of the differential manometer.

9. Machine according to claim 8, wherein the air used for operating said air cylinders and said electro-valves is an air charged with lubricant, and the test compressed gaseous fluid supplied to said two serially mounted distributing electro-valves and to the reference hollow body and the hollow body to be tested is a dry and filtered air said dry and filtered air as well as said air charged with lubricant being supplied to the different units by rotary manifolds placed above the rotary table and fed by ducts placed in a hollow shaft constituting a rotation spindle for the table, said hollow shaft being provided with a rotating connection for supplying said ducts leading to the manifolds.

10. Machine according to claim 2, comprising a pushing plate against which a pipe connected to the aperture of the hollow body abuts when closed by the cap, said switch causing operation of the first cylinder being operated by said pushing plate.

11. Machine according to claim 2, wherein the switch of each of the units is electrically supplied from said arcuate controlling means.

12. Machine according to claim 2, comprising a memory for storing the reading of said differential manometer, which reading indicates respectively the leaking and the leak-proof states of the heat exchanger under test, said memory having two parallel circuits coupled in series with said switch operating said first air cylinder, each of said two circuits comprising a first contact means forming a flip-flop circuit and a second contact operatively coupled with each of said units, each of said second contacts being controlled from a contactor driven by the rotatable table and activated by fixedly positioned cams whereby said gripper holding the hollow body is controlled to drop said hollow body at one of said two contactors depending on the initial state of said memory.

13. Machine according to claim 12, wherein the first contact forming a flip-flop circuit is normally closed on one of the two parallel circuits which corresponds to the leaking state of the hollow-body under test.

14. Machine according to claim 12, comprising a cam controlling the contactor corresponding to the leaking state of the hollow body under test which is first operated during rotation of the rotatable table.

15. Machine according to claim 2, comprising a marking device, and wherein said gripper of each unit is provided with means for operating said marking device for those of the hollow bodies which are considered by said reading means as being leak-proof, said marking device being coupled between the said first and second positions in which the hollow bodies are dropped depending on the leaking and respectively leak-proof state, whereby said marking device is not operated when said gripper has been released to drop a leaking hollow body since said gripper will move upon releasing thereof the means for operating the marking device.

16. Machine according to claim 1, wherein said first set of caps for closing all apertures but one of the hollow body is operated in synchronism with the cap through which the test compressed gas fluid is supplied to said hollow bodies.

17. Machine according to claim 1, wherein said arcuate controlling means includes a plurality of rings coupled to said table.

18. Machine according to claim 17, wherein said means for reading said differential manometer comprises a photo-electric cell having an ouput; an amplifier coupled to said output of said photo-electric cell said amplifier receiving power supply voltage from one ring of said arcuate controlling means; a memory, the reading being transmitted by a second ring of said arcuate controlling means to said memory and indicating respective leaking and leak-proof states of the tested hollow body just before evacuation of the two hollow bodies from the test gaseous fluid, said memory controlling said operating means for releasing of said carrier carrying the tested hollow bodies and dropping said tested hollow bodies in said first or second positions.

19. Machine according to claim 18, wherein the amplifier is supplied through a first switch controlled by a second switch, said second switch being operated by a pressure controlling component connected to the reference hollow body.

20. Machine as set forth in claim 18, comprising at least one partial counter of the respective leaking and leak-proof hollow bodies is mounted on each working unit and is coupled to and controlled by said memory.

21. Machine according to claim 1, comprising conveyors mounted along the periphery of said rotatable table below said first and second dropping positions of the hollow bodies.

22. Machine according to claim 1, comprising at least one device sensitive to the pressure of the compressed gaseous fluid circuits leading to said reference hollow body and to the hollow body to be tested and controlling the electric supply of the machine and also the power supply of said means for rotating said rotatable table.

23. Machine according to claim 1, wherein each working unit is provided with a bracket for supporting at least one hollow body waiting to be tested, whereby said waiting hollow body is held on the machine for a time corresponding to at least one revolution of said rotary table to enable its temperature to be equalized with that of the reference hollow body.

24. Machine according to claim 1, comprising at least one counter controlled by a circuit receiving in series, on one hand, first information from said carrier means supporting the hollow bodies and, on the other hand, second information from a contactor rotating with said table of the machine, said counter being operated only when said first and second information is supplied simultaneously, whereby counting takes place only upon placing of a hollow body to be tested on said carrier means and when said hollow body is undergoing a testing cycle.

* * * * *